Dec. 19, 1961 H. LANG 3,013,301
MACHINE FOR THE MANUFACTURE OF HOLLOW BODIES
Filed March 17, 1959 7 Sheets-Sheet 1

Dec. 19, 1961 H. LANG 3,013,301
MACHINE FOR THE MANUFACTURE OF HOLLOW BODIES
Filed March 17, 1959 7 Sheets-Sheet 2

Dec. 19, 1961    H. LANG    3,013,301
MACHINE FOR THE MANUFACTURE OF HOLLOW BODIES
Filed March 17, 1959    7 Sheets-Sheet 5

Dec. 19, 1961  H. LANG  3,013,301
MACHINE FOR THE MANUFACTURE OF HOLLOW BODIES
Filed March 17, 1959  7 Sheets-Sheet 7

United States Patent Office 3,013,301
Patented Dec. 19, 1961

3,013,301
MACHINE FOR THE MANUFACTURE OF HOLLOW BODIES
Helmut Lang, Siegsdorf, Upper Bavaria, Germany, assignor to Firma Rhenopack G.m.b.H., Worms-Speyerbenn, Germany
Filed Mar. 17, 1959, Ser. No. 800,039
Claims priority, application Germany Dec. 19, 1958
2 Claims. (Cl. 18—19)

This invention relates generally to machines for the manufacture of hollow bodies, and relates more particularly to machines for the automatic manufacture of bottle-shaped bodies having thin walls of thermoplastic foil, particularly hard foil free from any softener.

It is already known to manufacture bottle-shaped hollow bodies from relatively soft synthetic or plastic material in such a manner that a tube having a suitable wall thickness is suspended vertically downwardly and is sprayed and is immediately thereafter gripped below the spraying nozzle by two portions of a form or mold. The portions of the form grip the tube by moving towards each other, while compressed air is blown into the interior space of the tube by a mouthpiece extending into the tube from below, so that the tube is pressed against the inner surfaces of the form or mold having a shape corresponding to the desired form of the hollow body, and thereafter the material soldifies. With machines of this type it is difficult to manufacture more than one bottle during one operating cycle. A further drawback is that hollow bodies or bottles can not easily be made from a synthetic resin or the like which is free from softeners. Another disadvantage is that the known machines for the manufacture of such hollow bodies need to include a mechanism for making the synthetic material from the starting material, for plasticising it and for forming a tube, or a foil, and accordingly such prior art machines are complicated and expensive.

It is, accordingly, among the objects of the present invention to provide a machine for the manufacture of hollow bodies, particularly bottle-shaped bodies from solid material having as thin a wall as possible; these bodies serve as cheap production line packaging material for food, and as containers for sensitive liquid or pasty materials to preserve them, whereby the costs for the packaging is kept small by virtue of the small consumption of packing material.

Thermoplastic hard foils which are free from softeners can be used for such containers because such materials can be manufactured in a simple economical manner at a favorable price. Bottle-shaped hollow bodies can not yet, however, be made by known methods from such hard synthetic foils free from softeners.

Accordingly, another object of the present invention is to provide a machine for the manufacture of hollow bodies of thermoplastic, hard foils which are free from softeners.

In accordance with the present invention a machine is provided for manufacturing such hollow bodies, wherein a thermoplastic tape of synthetic material or resin is bent along its central axis and fed into a heating device to heat thoroughly both surfaces of the foil tape in order to bring it to a temperature favorable for plastic deformation.

Following the heating device there is disposed a shaping or forming device which includes two form or mold portions which are movable and which enclose respectively a portion of the foil tape between each other; compressed air is introduced into the inner space between the foil portion enclosed between the forming tool, so that the foils made plastic by the heating are pressed against the inner surface of the forming tool portions whereby hollow bodies are formed. The forming tools are preferably arranged in such a manner that several hollow bodies can be made simultaneously adjacent to each other.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings illustrating a preferred embodiment of the invention in which:

Figure 1:
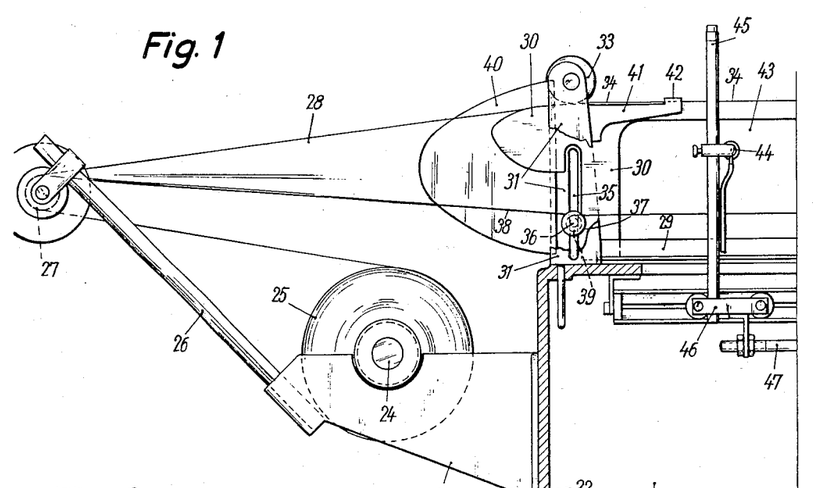
FIG. 1 is an elevational view, partly in section taken along line I—I of FIG. 2, of the left front portion of the machine where the starting material is fed into the machine.
Figure 2:
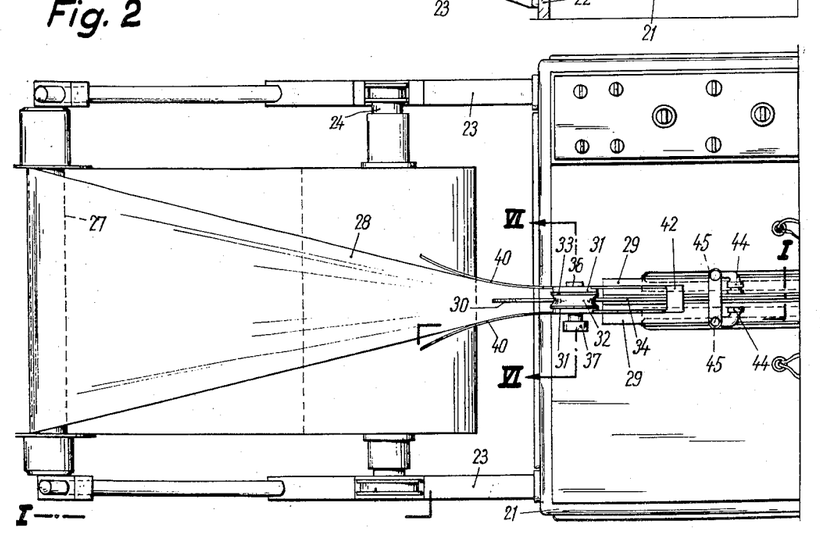
FIG. 2 is a plan view of the left front portion of the machine as illustrated in FIG. 1.
Figure 6:
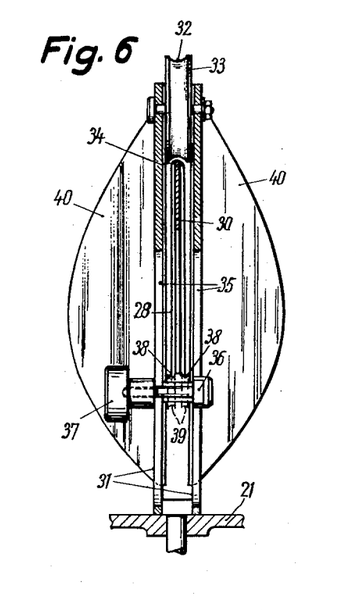
FIG. 6 is a sectional view, taken along line VI—VI of FIG. 2, and illustrating a portion of the front foil-feeding device.

In the front portion of the machine which is defined by the entrance of the starting or raw material into the machine there is disposed the foil feeding and forming station which is followed by the heating station, the hollow body forming station, and the cutting and ejecting station for the hollow bodies. The first of these stations is illustrated in FIGS. 1, 2 and 6, to which reference is now made.

The machine includes a covered machine frame 21 into which there are built or to which there are secured the various units of the individual stations. At the front face 22 of the frame 21 there are disposed two brackets 23 which support a shaft 24 of a foil roll 25. Removable arms or jibs 26 are disposed on the bracket 23 and adjustably support a reversing roller 27 for a foil tape 28, the latter being fed to the feeding station at an appropriate height and thence to the units thereof disposed at the fron portion of he upper par of the machine frame 21.

A vertically disposed guide sheet 30 is secured to a ground rail 29. At the two sides of the sheet 30 there are disposed supports 31, the upper ends of which carry a roller 33 that is provided with a groove 32 disposed adjacent and above an upper sliding edge 34 of the guide sheet 30. The middle and lower portions of the supports 31 are provided with longitudinal slots 35 carrying a shaft 36 having a height adjustable by means of an adjusting nut 37. The shaft 36 is either surrounded by a sleeve along which the lower edges 38 of the foil tape 28 slide which are bent about their middle axes, or the shaft 36 is provided with two disks 39 having grooves 38' for the same purpose. Outwardly bent guide sheets 40 are disposed at the two front edges of the supports 31 for guiding the foil tape 28 into the machine. At the rear edges of the supports 31 within the range of the upper sliding edge 34 of the guide sheet 30, there are provided further guide sheets 41, the two arms of which are interconnected at their free ends by a bridge 42 which arches or curves over the sliding edge 34.

Behind the two supports 31 there is provided in the guide sheet 30 a relatively large cut-out 43 within which front grippers 44 of the foil transport device grip the foil tape and pull it stepwise towards the rear. The front grippers 44 have an adjustable height and to this end they are secured to two rods 45 of a carriage 46 provided with running rollers, the carriage being coupled by means of a push rod 47 to the foil transport device in the rear portion of the machine. The front grippers 44 include pistons of small compressed air cylinders having heads of rubber which are moved towards the foil tape 28. It is sufficient if there is disposed only on one side of the foil tape 28 a compressed-air-actuated gripper head and on the other side of the foil a solid counter head. The front grippers 44 support the action of the grippers disposed in the rear portion of the machine particularly for pulling the foil tape 28 rearwardly.

Figure 3:
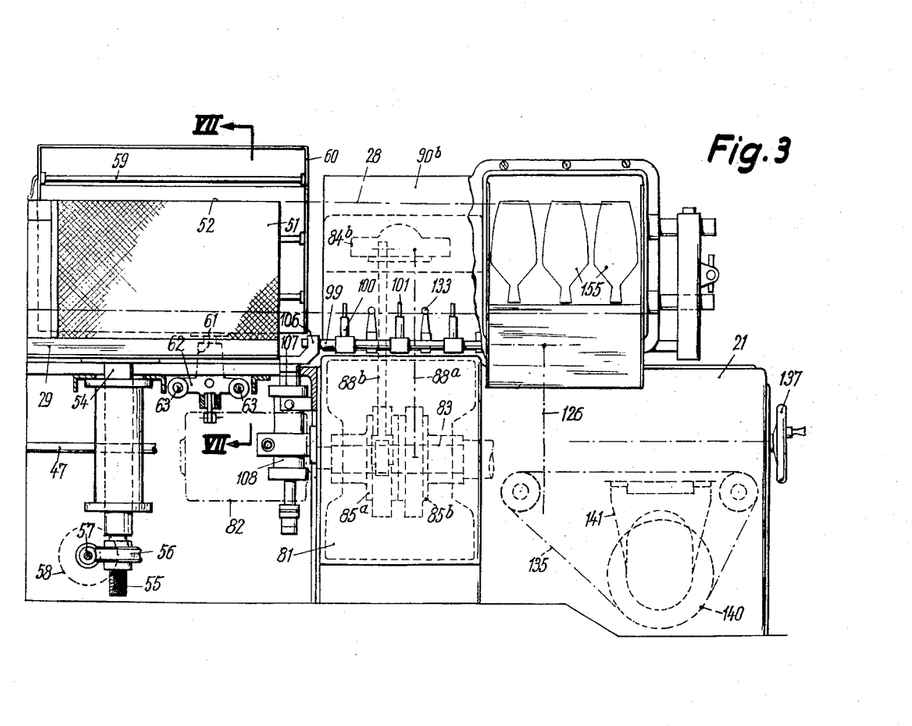
FIG. 3 is an elevational view, partly in section taken along line III—III of FIG. 3, of the right rear portion of the machine where the finished hollow bodies and the scrap leave the machine.
Figure 4:
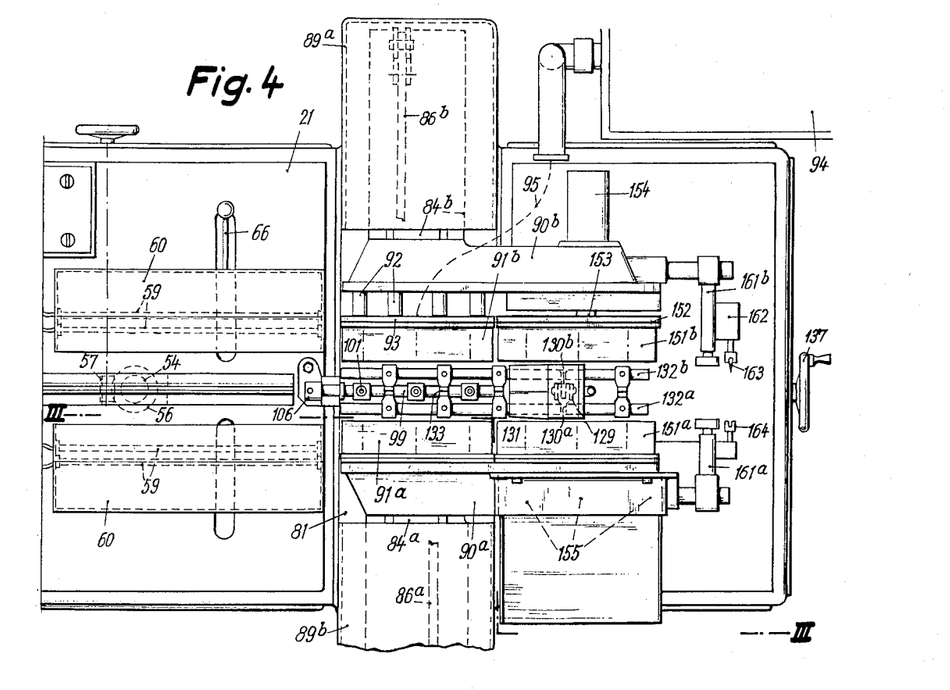
FIG. 4 is a plan view of the right rear portion of the machine as illustrated in FIG. 3.

As shown in FIGS. 3 and 4, an intermediate or central heating member 51 follows the guide sheet 30 and is arranged in the region of the heating station. The intermediate heating member 51 has its surface including an upper slide edge 52 covered with a screen cloth or the like which has the purpose of preventing adhesion of the heated and very plastic foil to the member 51. Instead of a wire screen or fabric or netting it is also feasible to utilize a plate having raised or embossed thereon in a raster-like pattern of any suitable form outwardly extending small burls or projections so that the foil transported along the heating member and which temporarily attaches thereto is supported by numerous points and not by a flat surface. The heating member 51 is also secured to the ground rail 29 which is supported by a guide spindle 54 disposed in the machine frame 21 and having its lower end provided with a thread 55 supporting a worm wheel 56 which may be rotated by means of a hand wheel 58 by virtue of a worm 57, whereby the guide spindle 54 and thereby the ground rail 29 is moved up and down so that the foil tape 28 may be adjusted to the correct height with respect to the shaping tools.

Figure 7:
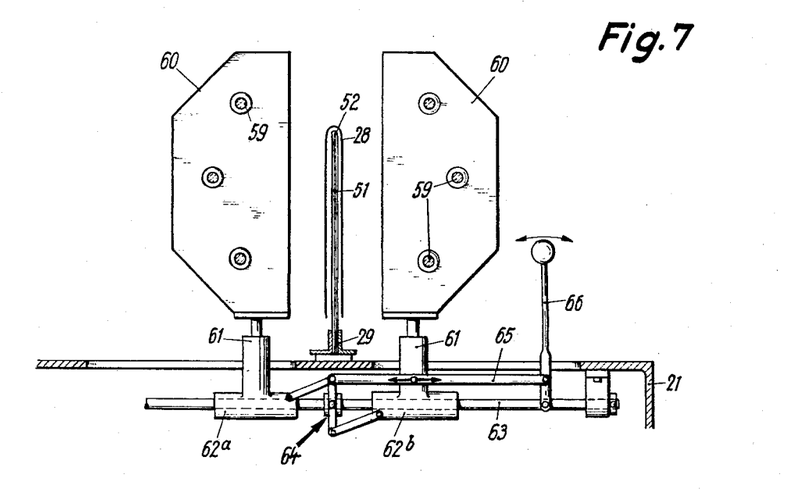
FIG. 7 is a sectional view of a portion of the heating station provided with manual control of the outer heating device.

At both sides of the heating member 51 which heats the inner surfaces of the foil tape 28 draped thereabout, there are disposed heating members 59 which heat the outer surfaces of the foil tape 28 and which are each surrounded by a reflector 60 open towards the foil. The reflectors 60 which have an adjustable height are mounted by means of a foot 61 in carriages 62a and 62b which are slidably disposed on guide rails 63 and movable in a direction transverse to the direction of movement of the foil tape 28 or the heating member 51. The carriages 62a and 62b which support the reflectors 60 are interconnected by means of a lever arrangement 64 (see FIG. 7) in such a manner that they are moved towards or away from each other in the same manner. Thereby there is achieved a uniform heating of the outside of the foil on both sides of the heating member 51. A lever arrangement 64 in one embodiment thereof is connected by means of a rail 65 to a hand lever 66 (FIG. 7) in order to control the outer heating members 59 in a simple manner by movement of the lever 66 by hand to and fro whereby in accordance with the visible softening degree of the foil the heating members are respectively moved towards the foil tape 28 or away from it.

Figure 8:
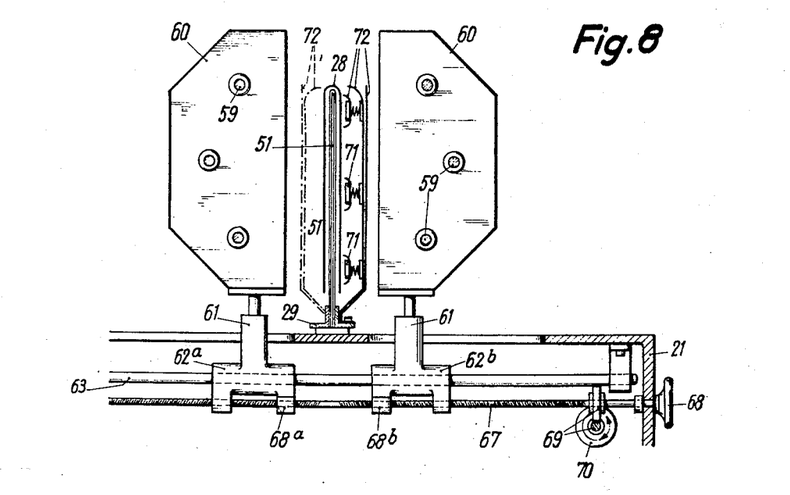
FIG. 8 is a sectional view of a portion of a modified heating station which permits automatic control of the outer heating device.

It is, however, also feasible to achieve the movement of the carriages 62a and 62b supporting the reflectors 60 and the outer heating members 59 by means of a threaded spindle having a left hand and a right hand thread whereby a corresponding threaded nut portion 68a, 68b is connected to a corresponding carriage 62a and 62b (see FIG. 8). The threaded spindle 67 may again be actuated by hand, for example by means of a hand wheel 68 or may be driven by means of a gear drive 69 by a reversible servo motor 70. The latter arrangement is particularly suitable when it is desired to control the outer heating members 59 automatically. This may be effected by an electric control device, not shown, which has a minimum of inertia and which may be controlled, for example, by heat feelers 71 which are disposed as closely as possible to the heated foil immediately following the heating device and are screened from the heat influence of the heating members.

After the heating station where the foil tape 28 is made plastic by heating it to an optimum temperature before the hollow bodies are formed, there follows the forming station. This is illustrated in the middle portion of FIGS. 3 and 4.

Figure 9:
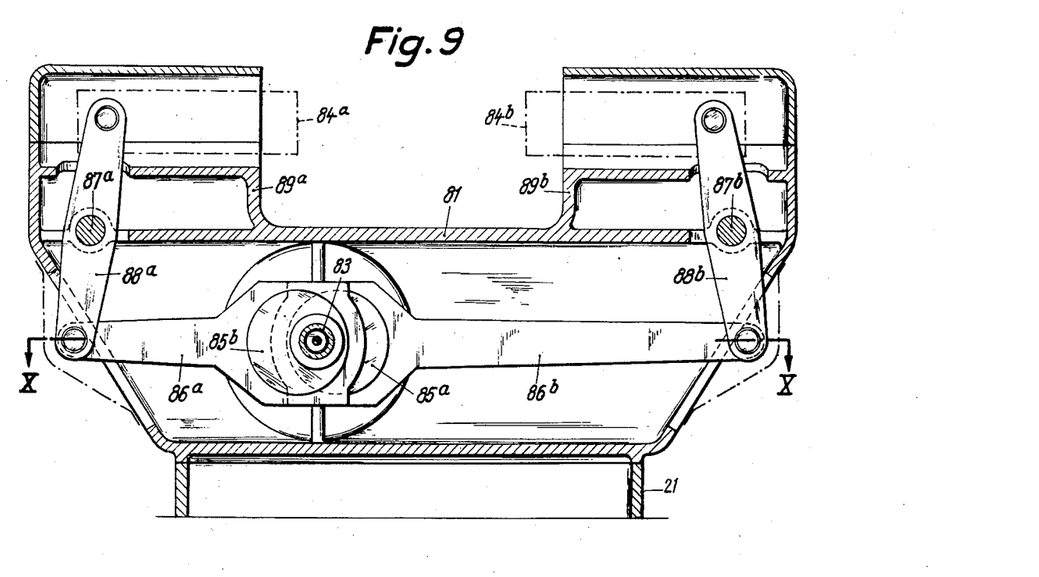
FIG. 9 is a sectional view of a portion of the machine frame, illustrating the tool carriage guidance and drive means.
Figure 10:
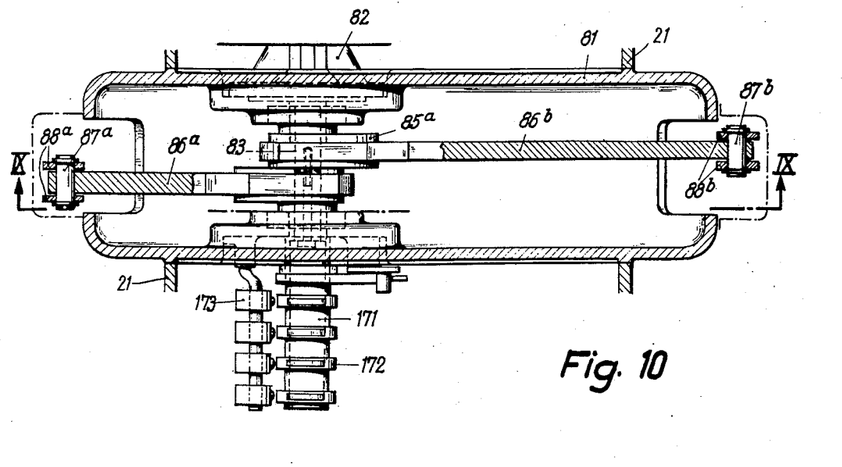
FIG. 10 is a horizontal sectional view, taken along the line X—X of FIG. 9, and illustrating the drive of the tool carriages.

At this point there is disposed in the machine frame 21 a stable bridge-like hollow body 81 (FIGS. 9 and 10) disposed transversely to the longitudinal axis of the machine to which there is flanged a main drive motor 82 and in which there are journalled a main drive shaft 83 as well as a drive mechanism for a tool supporting carriage 84, as well as tools. To the main drive shaft 83 there are secured by wedges eccentric disks 85a, 85b by means of which eccentric rods 86a, 86b are actuated which in turn are connected with double armed levers 88a, 88b swinging about bearing bolts 87a, 87b. The upper ends of the levers 88a, 88b are linked to the carriages 84 (84a, 84b) which are journalled in a guide 89a, 89b so as to be movable transversely to the longitudinal direction of the machine. The carriages 84 support the plates 90a, 90b for securing thereto the tools.

The shaping or forming tool or mold for the manufacture of the hollow bodies from the foil tape made plastically deformable by the prior heating comprises two portions 91a and 91b. One of the tool portions 91b simultaneously serves as an electrode for welding the seams in the center plane of the hollow bodies and is secured to a plate 93 supported by insulating members 92 and connected to a high-frequency generator 94 by a conductor or lead 95. The shaping tools are preferably arranged as multiple tools, for example, triple tools as may be seen from FIG. 11.

Figure 11:
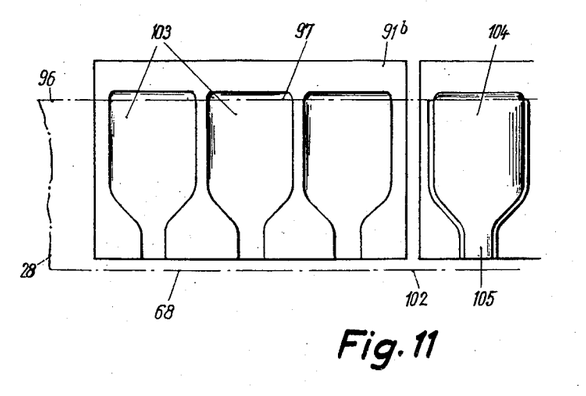
FIG. 11 is a schematic view of the position of the forming and cutting tools and the foil tape.

The opening or mouth of the hollow bodies or the neck of a bottle is disposed at the lower portion. The foil tape 28 which is fed or introduced between the form or mold portions 91a, 91b, is arranged in such a manner that its upper bent-over edge 96 is disposed about at the height of the line 97 while the lower edges are located about at the height of the line 98. Below the shaping tools there are disposed mouthpieces 100 for compressed air arranged on a tube 99. The mouthpieces 100 extend with their outer tube portions 101 within the range of the mouth of the hollow body or the neck of a bottle between the two lower edge strips 102 of the foil tape 28 and into the inner space of the form or mold which confines from both sides the foil tape 28.

As soon as the two form portions 91a, 91b are closed, compressed air leaves the tube mouth pieces 101 which presses the heated foil 28 against the inner walls 103 of the hollow forms, whereby the foil cools so that the hollow bodies 104 retain their shape. As soon as the hollow bodies 104 are formed, there takes place a welding of the parts of the foil disposed outside of the hollow bodies and adjacent each other throughout a predetermined width by high-frequency energy. Before the foil tape 28 with the hollow bodies 104 formed in the shaping station is transported another step, the tube mouth pieces 101 are retracted downwardly from the necks 105 of the hollow bodies 104 which is effected simultaneously by a downward movement of the tube 99 supported by a head 106 of a piston rod 107 of a vertically disposed container 108 for compressed air. The container 108 is preferably connected by a flange to the bridge-like machine portion 81 and is disposed between the heating and shaping stations.

Figure 5:
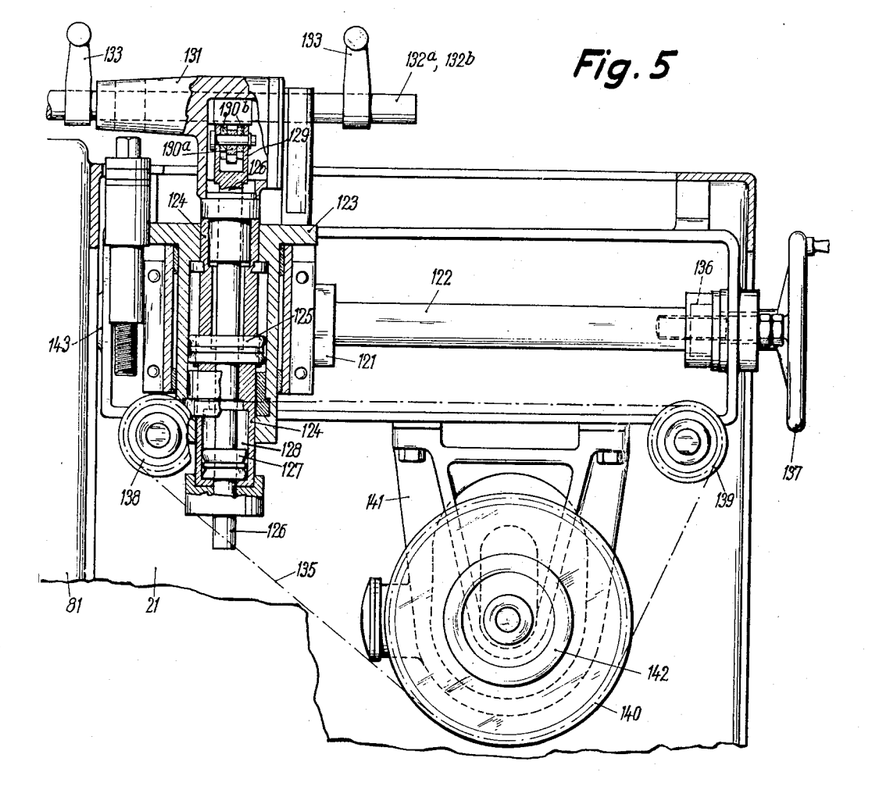
FIG. 5 is a fragmentary elevational view, partly in section, of the foil transport mechanism disposed within the right rear portion of the machine.

At the opposite side along the longitudinal direction of the machine and in the rear and below the cutting or separating and ejecting station for the hollow bodies 104, there is disposed the transport device with its drive as may be seen particularly from FIG. 5. The device includes a carriage 121 which is movably disposed on a guide rail 122 to reciprocate in the longitudinal direction of the machine and which bears a container 123 for compressed air within which there is journalled a hollow shaft 124 with a piston 125 to move axially up and down. In the hollow shaft 124 there is guided a piston rod 126 which is actuated by a piston 127 in a compressed air container 128. The head of the piston rod 126 is provided with a fork 129 to which there are linked levers 130a, 130b which are rigidly connected with shafts 132a, 132b rotatably mounted in the head 131 of the shaft 124.

The shafts 132a, 132b support gripping arms 133 adjustably in the longitudinal direction thereof which in turn support at their upper ends gripper heads 134 of an elastic material, for example, rubber, whereby each two opposed heads cooperate in pairs. When the piston rod 126 is moved upwardly by its piston 127 in the compressed air cylinder, the tilting levers 130a, 130b linked to the forked head 129 are rotated in opposite senses of rotation through a predetermined angle whereby the shafts 132a, 132b are rotated whereupon the grippers 133, 134 secured thereto are spread apart. When the grippers or the gripper heads 134 are opened, the head 131 of the gripping device is lifted upwards by the shaft 124 so that the lower edge strip 102 of the foil tape 28 which is to be transported by another step toward the rear, is now positioned between the gripping heads 134. By an upward movement of the piston rod 126 the gripers 134 are moved towards each other so that they clamp the lower foil edge 102 between themselves whereupon transport by another step towards the rear can take place. To this end, the carriage 121 is moved toward the rear by means of a drive chain 135 in the longitudinal direction of the machine until the carriage abuts a stop 136 which is adjustably positioned by a handwheel 137.

The drive chain 135 is guided over two reversing rolls 138, 139 and a drive chain wheel 140. A slipping clutch 142 is provided between the drive chain 140 and a drive motor 141, whereby there is assured that the carriage 121 always is held in its end positions defined by the stops 136 and 143 for uniformity of length of the steps during transport of the foil tape 28. This is needed for the proper operation so that the formed hollow bodies 104 in the cutting and separating station are always in the correct position with respect to their tools. The length of the steps may be varied by adjustment of the movable stop 136.

Cutting and severing tools 151a, 151b are disposed in the longitudinal direction of the machine at the height of the forming tools 91a, 91b below the same and are also secured to the tool carrier plates 90a, 90b. One portion 151b of the cutting tool is mounted on a carrier plate 152 which may be moved parallel to the tool carrier plate 90b in a transverse direction, the plate 152 being carried by a rod 153 of a compressed air cylinder 154 secured to the tool carrier 90b. By means of the compressed air cylinder 154 and after the closing of the tools 91a, 91b and 151a, 151b the cutting tool portion 151b is displaced by a small amount so that the cutting edges of this tool operate to cut or remove the hollow bodies 104 outside of a small seam strip from the foil tape 28 so that ejectors or springs or compressed air nozzles or the like disposed in the cutting or severing tools 151a, 151b may eject the hollow bodies 104 through openings 155 in the tool portion 151, for example, into a trough 156 from which they may be taken or mechanically conveyed to some other place.

The remaining foil tape which issues from the machine behind the cutting tools 151a, 151b and from which the hollow bodies 104 have been cut away represents scrap which may either be wound on a roll or which may be cut into small pieces by means of an additional cutting device. This cutting device includes a pair of grippers 161a, 161b which are secured to the tool carrier plates 90a, 90b; a cutting knife 163 actuated by a compressed air piston 162 is connected to the gripper 161b and a counter bearing 164 of the knife 163 is connected with the gripper 161a.

I wish it to be understood that I do not desire to be limited to the exact details of construction shown and described, for obvious modifications will occur to a person skilled in the art.

Having thus described th einvention, what I claim as new and desire to be secured by Letters Patent, is as follows:

1. In a machine, for use in the manufacture of hollow bodies having thin walls of the thermoplastic sheet, the combination of means operable for mounting for feeding a thermoplastic sheet, a transport device operable for propelling the sheet in a step-by-step manner throughout a path in the machine, a guide device disposed near the beginning of said path and operable for folding and bending the sheet substantially along its center axis and including a guide member disposed in a vertical plane and having an upper sliding edge for supporting the bent-over sheet, a heating device including an extended first heating member disposed in the plane of said guide member near the start of said path and being operable to be surrounded by the bent-over sheet to heat the internal surface thereof, two further heating members each movably disposed on a side of the bent-over sheet, said further heating members being spaced from said first heating member and operable to heat the external surface of said sheet, actuating means operable for moving said further heating members toward and away from said sheet, a forming device disposed about midway of said path and including two opposite forming parts, two carriages movable towards and away from each other, each of said forming parts being mounted on one of said carriages, compressed air nozzles disposed between said forming parts and movable up an down into and out of said forming parts, and a severing device disposed near the termination of said path and including two severing parts arranged for cutting a finished hollow body from the sheet, each severing part being mounted on a carriage, said forming device and said severing device each including a plurality of members, each member being formed of two sections with one member section assigned to each part and operable to work on one complete hollow body of said sheet, whereby a plurality of bodies may be made at each step, the length of each transport step being so arranged that each body will be successively aligned in a corresponding member first of said forming device and then of said severing device.

2. A machine for the manufacture of thin-walled hollow bodies of thermoplastic sheet, said machine comprising means operable for mounting for feeding a thermoplastic sheet and for dispensing the sheet; a transport device operable for propelling the sheet throughout a path in a stepwise manner, a guide device disposed near the beginning of said path and operable for folding and bending the sheet substantially along the center axis thereof and including a guide member disposed in a vertical plane and having an upper sliding edge for slidably supporting the bent-over sheet; a heating device including a central first heating member disposed in the plane of said guide member near the start of said path and being operable to be surrounded by the bent-over sheet to heat the internal surface thereof, and two outer further heating members each movably disposed on a side of the bent-over sheet, said further heating members being spaced from said first heating member and operable to heat the external surface of said sheet, and actuating means operable for reciprocating said further heating members toward and away from said sheet; a forming device disposed about midway of said path and including two carriages movable towards and away from each other, two forming portions each mounted on one of said carriages and comprising a plurality of members, a compressed air nozzle disposed between each pair of forming members and movable into and out of said forming members, a drive shaft for said carriages, and lever means interconnecting said drive shaft to said carriages for reciprocating said carriages; and a severing device disposed near the termination of said path and including two parts arranged for cutting a finished hollow body from the sheet, each severing part being mounted on a carriage and comprising a plurality of members, each member of said forming device and of said severing device being operable to work on one complete hollow body of said sheet, whereby a plurality of bodies may be made at each step, the length of each transport step being so arranged that each body will be successively aligned in a corresponding member first of said forming device and then of said severing device.

References Cited in the file of this patent

UNITED STATES PATENTS

| | | |
|---|---|---|
| 2,015,445 | Bierer et al. | Sept. 24, 1935 |
| 2,559,365 | Middleton et al. | July 3, 1951 |
| 2,848,751 | Vernon | Aug. 26, 1958 |

FOREIGN PATENTS

| | | |
|---|---|---|
| 167,535 | Australia | Apr. 24, 1956 |
| 1,134,426 | France | Dec. 3, 1956 |
| 687,292 | Great Britain | Feb. 11, 1953 |